Jan. 22, 1924.
C. HANSEN
1,481,364
AUTOMOBILE BUMPER
Filed March 23, 1922
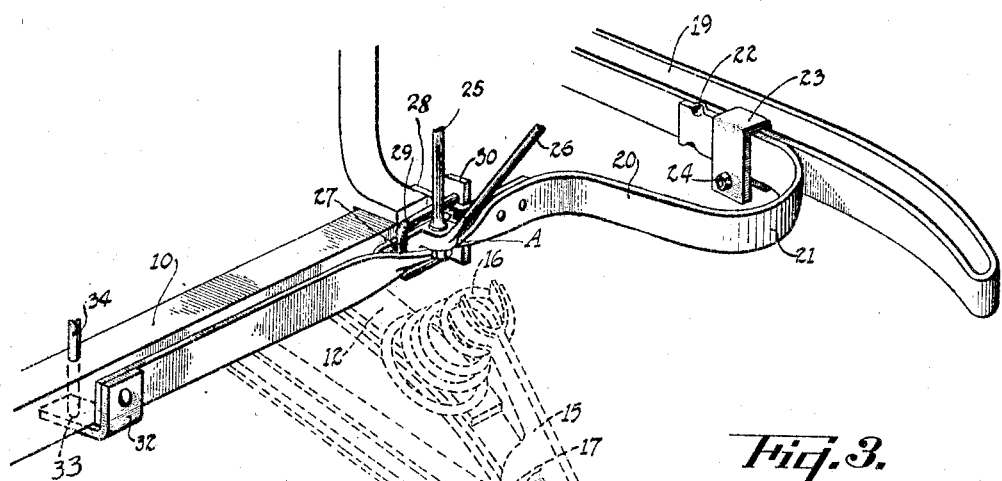
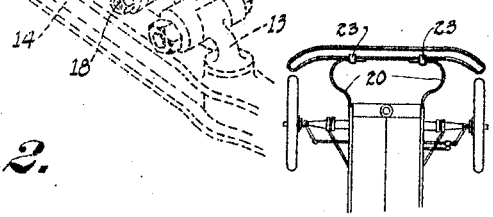
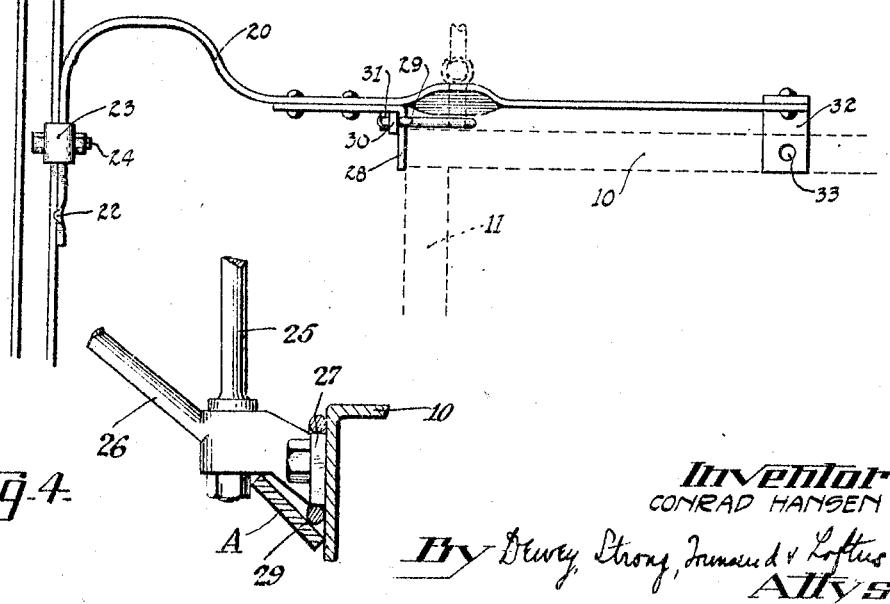
Inventor
CONRAD HANSEN
By Dewey, Strong, Townsend & Loftus
Att'ys Patented Jan. 22, 1924.

1,481,364

UNITED STATES PATENT OFFICE.

CONRAD HANSEN, OF SAN FRANCISCO, CALIFORNIA, ASSIGNOR TO AMERICAN CHAIN COMPANY, INC., OF BRIDGEPORT, CONNECTICUT, A CORPORATION OF NEW YORK.

AUTOMOBILE BUMPER.

Application filed March 23, 1922. Serial No. 545,971.

*To all whom it may concern:*

Be it known that I, CONRAD HANSEN, a citizen of the United States, residing at the city and county of San Francisco and State of California, have invented new and useful Improvements in Automobile Bumpers, of which the following is a specification.

This invention relates to an automobile bumper, and is particularly adapted for application to cars of the "Ford" type.

At the present time it is desirable to provide automobiles of the "Ford" type with a simple automobile bumper, which may be easily attached to the chassis of the car without requiring alteration of existing parts and while utilizing fastening means already in position. It is also desirable to construct a bumper which will afford clearance for shock absorbers and other accessories carried by the axle of the vehicle; and it is the principal object of the present invention to provide an automobile bumper, by which the aforesaid results may be readily obtained, and which bumper can be rapidly and easily fastened to the vehicle in a manner to securely hold the bumper bar transversely of the frame, and to insure that impact shock delivered to the bumper bar will be directly imparted to the frame without throwing a strain on the fastenings by which the bar is secured in position.

The present invention contemplates the use of a bumper bar adapted to be disposed transversely of a vehicle frame, and which bar carries looped brackets secured by their outer ends to the bar and secured to the frame of the vehicle by extensions extending longitudinally thereof, said extensions being formed with abutments by which shock will be delivered directly to the frame and otherwise formed so that clearance will be afforded for shock absorbers and the like carried by the vehicle axle.

The invention is illustrated by way of example in the accompanying drawings in which—

Fig. 1 is a fragmentary view in perspective, showing a portion of the bumper bar and one of its attachment brackets as applied to the vehicle frame, a portion of the vehicle axle and a shock absorber being indicated in dotted lines.

Fig. 2 is a view in plan, showing the parts as disclosed in Fig. 1, and more particularly disclosing the bracket abutment.

Fig. 3 is a plan view in diagram, showing the complete bumper as applied to the frame of the vehicle.

Fig. 4 is an enlarged fragmentary view in section and elevation showing the relation of the bumper bracket arm, with parts of the vehicle body.

Referring more particularly to the drawings, 10 indicates one of the side frame members of a vehicle; 11 being a transverse frame member secured across the front of the frame and connecting parallel side frame members 10. This construction will be recognized as that embodied in the frame structure of automobiles of the "Ford" type, in which instance the frame suspension comprises front and rear semi-elliptical springs 12. These springs are centrally secured to the centers of the transverse frame members 11. The outer ends of these springs are pivotally connected to brackets 13, carried by the vehicle axles 14.

By reference to Fig. 1 it will be seen that the front vehicle axle has been shown, and that a shock absorbing element has been interposed between the bracket member 13 and the spring eye. In the present case this shock absorber is of the "Hassler" type and comprises a lever arm 15, pivotally secured to the bracket 13 and resting at its free end against the apex portion of a spiral spring 16, the base portion of which rests against the upper leaf of the cross spring 12. A downwardly projecting extension 17 is formed as a part of the lever 15 and receives a spring bolt 18, which passes through the eye of the spring 12. The detailed description of this shock absorber has been made, due to the fact that it has presented a difficult problem in making a bumper attachment, as the bumpers do not, as a rule, afford clearance for shock absorbers of this type.

The bumper comprises a transverse bar 19. In the present case this bar is formed of parallel bar portions, having their greatest sectional width disposed in a vertical plane, and being looped at opposite ends to provide fenders for the wheels of the vehicle. This bumper is supported from the vehicle frame by a pair of attachment brackets 20. These brackets are formed with outer oppositely extending looped portions 21, which terminate in a flat section conforming to the back face of the bumper bar. At points along opposite edges of this portion of the brackets protrusions 22 are formed which overlap the edges of the back bumper strip and tend to hold the brackets and bumper bar in alignment. A U-shaped clevis 23 embraces the back bumper strip and the parallel portion of the bracket to clamp them in rigid relation to each other by means of a clamp bolt 24.

The portion of the attachment bracket extending rearwardly from the loop is disposed substantially at right angles to the bumper bar and extends along the outer face of the frame member 10. In order to make it possible for the straight portion of the bracket to be in a clearance position relative to the shock absorber structure and to assist in rigidly holding the bracket section A is bent outwardly from the vertical plane, within which this portion of the bracket lies, so that it will snugly fit around lamp and fender brackets 25 and 26 which are secured to the side of the frame and near the forward end thereof. This portion A wedges between the nut of the lamp post and the fender bracket, thus preventing spreading of the bumper arms, while assisting in holding them rigidly. These brackets are held by a fitting 27, directly secured to the side face of the frame.

Extending inwardly from the bracket and resting against the forward end of the frame member 10 is an abutment 28, which is carried by the straight portion of the bracket and will act to deliver shock imparted to the bracket directly to the frame and substantially longitudinally thereof. This abutment and the adjacent bracket fitting 27 are utilized to hold the forward end of the bracket in position. This is done by a U-bolt 29 which passes around the fitting and abutment and is disposed with its parallel portions extending forwardly to receive a clamp plate 30. This plate 30 is held against the forward face of the abutment by nuts 31. Due to this arrangement it will be seen that any end thrust on the bracket will be imparted to the frame and that there will be no strain delivered to the fastening member 29. It will also be understood that the U-bolts may be designed to extend vertically if desired, without departing from the spirit of the present invention.

The straight portion of the bracket extends rearwardly from the fitting 27 and conforms, for the remainder of its length, to the frame. The rear terminating end of the bracket may be secured to the frame by two methods, indicated separately by solid and dotted lines in Fig. 1. The preferable method is to provide an angle plate 32, which is secured to the rear end of the bracket, extending at right angles to the width thereof, and projecting beneath the frame member 10. An opening 33 is formed through this projecting portion to receive a rear splash-pan bolt 34, which extends downwardly through the frame. In the second form of the rear attachment the bumper bracket extends along the frame for an additional distance and is directly bolted to the frame by the fender bracket bolt 35, which projects from the vertical face of the frame web.

In the application and operation of the present invention the brackets are loosely secured to the back strip of the bumper bar by means of the clevis members 23. The straight, rearwardly extending portions of the brackets may then be disposed along opposite sides of the frame members 10 with the abutments 28 resting against the front faces of the frame members. The U-bolt 29 may then be passed around the fitting 27 and the abutment 28, after which it is clamped in position by the plate 30 and the nuts 31 with the upper edge of the bent section A securely wedged between the lamp post nut and the fender bracket as shown in Fig. 4. The rear ends of the brackets may then be secured to the frame by either of the desired methods which embody the use of the pan bolt 34 or the rear fender bracket bolt 35. When the attachment brackets are thus secured, the bolts 24 of the clevises are tightened to rigidly clamp the brackets to the back strip of the bumper bar. Due to this arrangement adjustment of the brackets may be readily made for cars varying in widths.

When the car is operated and the spring 12 is deflected, the car frame, with the bumper bracket, will move downwardly and would tend to interfere with the shock absorber if it were not for the fact that the bracket is held in its extreme uppermost position, due to the clearance afforded by the bent portion of the bracket, indicated at A. When shock is imparted to the bumper, it will of necessity operate along lines substantially horizontal and in a longitudinal direction relative to the frame. Minor shocks will be absorbed by the loops of the bumper brackets, while more excessive blows will be delivered directly to the frame through the abutments 28. These abutments will relieve all of the fastenings of the brackets from strain and will insure that the attachment brackets will not become loose or their fastenings broken off.

It will thus be seen that the bumper structure here provided embodies means for directly imparting shock to the frame of the vehicle without affecting the connections of the bumper brackets with the frame, at the same time affording sufficient clearance for accessories, such as shock absorbers which are carried by the vehicle axles, and making it possible for the bumper to be readily applied to cars varying in widths.

Having thus described my invention, what I claim and desire to secure by Letters Patent is—

1. The combination with a bumper member designed to extend across the end of an automobile, of rearwardly extending attaching arms therefor, said arms having means at their rear end for attachment to the automobile frame and having intermediate offsets forming abutments to engage the automobile frame members endwise and thereby resist impact against the bumper member, said attaching arms comprising flat steel bars lying in a vertical plane, said arms having a portion between said end attaching means and said abutment disposed at an angle to the vertical to afford clearance when in place upon the machine.

2. The combination with a bumper member designed to extend across the end of an automobile, or rearwardly extending attaching arms therefor, said arms having means at their rear end for attachment to the automobile frame and having intermediate offsets forming an abutment to engage the automobile frame members endwise and thereby resist impact against the bumper member, said attaching arms comprising flat steel bars lying in a vertical plane, said arms being bowed horizontally and outwardly forwardly of said abutments.

3. A bumper for "Ford" automobiles comprising a bumper member adapted to extend across an end of the machine, with rearwardly extending attaching arms each consisting of a strip of spring steel arranged in a vertical plane, the rear end of the arms having means of attachment to the car body at a point somewhat removed from the adjacent end of the car body, supplemental attaching means for the spring arms immediately adjacent to said end of the car body, whereby the said arms each have two spaced points of attachment to the body, and means for relieving said attaching means of thrust due to impact of an object with the bumper member, said spring arms having twisted portions intermediate said attaching means so that said twisted portions lie in a plane at a sufficient angle from the vertical to afford clearance to the arms under the spring action of the car body.

4. In combination with the frame of an automobile, a transversely disposed bumper bar, a pair of rearwardly extending attachment arms therefor, said arms having their greatest sectional width in vertical planes and being disposed longitudinally of the vehicle frame, an abutment carried by each of the arms intermediate their ends and adapted to rest against the front of the automobile frame, and means for holding the rear portions of the arms in position against the frame and the abutments against the frame.

5. In combination with an automobile frame, a transversely disposed bumper bar, a pair of rearwardly extending attachment arms secured thereto, said arms each being formed with outer yieldable portions, an abutment carried by each arm and resting against the frame ends, extensions of the arms lying along the sides of the frame and secured thereto, and bent sections formed in the rearwardly extending portions of the arms to accommodate and afford clearance for brackets carried along the sides of the frame.

6. In combination with the frame of an automobile, a transversely disposed bumper bar, a pair of rearwardly extending attachment arms therefor, said arms having their cross sectional width in vertical planes and being disposed longitudinally of the vehicle frame, an abutment carried by each of the arms intermediate its ends and adapted to rest against the front of the automobile at a point adjacent a bracket normally carried by the vehicle frame, means for holding the rear portions of the arms in position alongside of the frame, and means for securing the abutment to the frame bracket and holding said abutment against the end of the frame.

CONRAD HANSEN.